United States Patent
Huber et al.

(10) Patent No.: US 6,167,996 B1
(45) Date of Patent: *Jan. 2, 2001

(54) METHOD AND SYSTEM FOR DETERMINING CLUTCH STATUS IN A VEHICLE

(75) Inventors: Jon M. Huber, Laurinburg, NC (US); Gerhard Böckmann, Laatzen; Andreas Böhm, Wennigsen, both of (DE)

(73) Assignees: ZF Meritor, LLC; WABCO Standard GmbH, both of Laurinburg, NC (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/988,465

(22) Filed: Dec. 10, 1997

(51) Int. Cl.$^7$ .................................................. F16H 59/56
(52) U.S. Cl. .............................................. 192/30 W
(58) Field of Search ............................ 74/335, 336 R; 477/175, 79, 80, 97; 192/3.61, 3.62, 3.63, 103 R, 104 R, 106 R, 30 W; 701/64, 55, 67, 68, 58

(56) References Cited

U.S. PATENT DOCUMENTS

| | | |
|---|---|---|
| 3,834,499 | 9/1974 | Candellero et al. . |
| 4,558,772 * | 12/1985 | Grimes et al. .................... 192/103 R |
| 4,624,349 * | 11/1986 | Watanabe ........................ 477/175 X |
| 4,632,231 * | 12/1986 | Hattori et al. ........................ 477/175 |
| 4,646,891 | 3/1987 | Braun ................................... 477/175 |
| 4,711,141 | 12/1987 | Speranza ........................... 477/84 X |
| 4,712,658 * | 12/1987 | Grunberg ...................... 192/103 R X |
| 4,898,049 | 2/1990 | Niikura . |
| 5,020,645 * | 6/1991 | Sasa ................................. 192/3.63 X |
| 5,053,959 | 10/1991 | Genise . |
| 5,081,588 * | 1/1992 | Holmes et al. ......................... 701/52 |
| 5,408,895 * | 4/1995 | Chan et al. ......................... 74/336 R |
| 5,411,124 | 5/1995 | Olson .............................. 192/103 R |

FOREIGN PATENT DOCUMENTS

| | | |
|---|---|---|
| 0241216 | 7/1986 | (EP) . |
| 0697302 | 8/1994 | (EP) . |

OTHER PUBLICATIONS

Operator's manual for the Mercedes Actros, pp. 20–23, May 1996.*
European Patent Search Report—Feb. 28, 2000, Application EP19980122536, filed Nov. 30, 1998.

* cited by examiner

Primary Examiner—Charles A Marmor
Assistant Examiner—Ankur Parekh
(74) Attorney, Agent, or Firm—Carlson, Gaskey & Olds

(57) ABSTRACT

A shift by wire vehicle transmission system includes control methods that are especially useful for controlling the transmission under start-from-stop conditions. Since the master clutch must be manually operated under such conditions, the invention includes a method of determining whether the clutch is open or closed. The rotational speed of the engine output shaft is compared to the rotational speed of the transmission input shaft and if the difference between those speeds is greater than a preselected value, the clutch is determined to be open. Another use of the disclosed method is to provide an indication to the driver whether a desired gear has been engaged. A visual or audible signal indicates to the driver that the desired gear is not yet engaged. Once engagement is confirmed, the signal is turned off and the driver knows that the desired shift has been accomplished.

13 Claims, 2 Drawing Sheets

METHOD AND SYSTEM FOR DETERMINING CLUTCH STATUS IN A VEHICLE

BACKGROUND OF THE INVENTION

This invention generally relates to control methods useful with heavy duty vehicle transmissions that allow a driver to manually select an automatically implemented shift.

Heavy duty vehicles such as trucks typically include a multi-speed transmission that is manually controlled by the driver. The driver utilizes a manual stick shift and clutch to select one of several transmission gears depending upon the driving conditions, for example. The manual stick shift allows the driver to select from the various transmission gears, which vary the ratio between the input speeds of the transmission from the engine and the output speed of the transmission.

More recently, systems have been proposed to simplify the task of shifting the transmission. Such systems allow a driver to move a shift lever in one of two directions or to push buttons to indicate a desired shift. An electronic controller determines the desired gear ratio and operates an automatic shifting module to change the transmission into the desired gear ratio. Such systems have advantages in that they can simplify the task of driving a heavy duty vehicle.

The nature of a transmission associated with a heavy duty vehicle requires a variety of controlling strategies that must be implemented by the electronic controller to effect appropriate transmission operation. One situation where this is true is providing appropriate feedback to the driver of the vehicle regarding the status or condition of the transmission. This invention includes a method of providing the driver an indication of when the transmission is engaged into a desired gear after the vehicle has been at rest.

Another issue presented by attempting to automate portions of heavy duty vehicle transmissions is the possibility for introducing a relatively large number of electronic components and associated wiring. This invention includes a control method for determining the status of the master clutch associated with the transmission. The method of this invention provides the advantage of eliminating electronic components that would otherwise be associated with such a transmission by utilizing information regarding other portions of the transmission that are already available.

SUMMARY OF THE INVENTION

This invention includes methods of controlling a semi-automatic vehicle transmission. The disclosed implementations of the methods of this invention are especially useful for controlling the vehicle transmission after the vehicle has been stopped.

One aspect of this invention includes determining the status of the clutch associated with the transmission. The clutch can be in an open condition or a closed condition where the engine output shaft is coupled to the transmission input shaft. The clutch status is determined by comparing the rotational speeds of the engine output shaft and the transmission input shaft. If the difference between those speeds is greater than a predetermined value, then the determination is made that the clutch is open and that information is used appropriately for engaging the next desired gear, for example.

Another aspect of this invention includes providing the driver an indication of when a desired gear is engaged after the vehicle has been stopped. The driver makes a selection for the next desired gear using the shift lever. The electronic controller automatically determines what the next desired gear is. The controller then determines whether that gear is engaged and, if not, provides the driver with an indication that the desired gear is not yet engaged. The controller then causes a shifting module to move the transmission toward engagement of the desired gear. The indication is provided to the driver that the desired gear is not engaged until such engagement is accomplished. In one embodiment, the indication to the driver is a flashing light. The light begins flashing once the driver selects the next desired gear and remains flashing until that gear is engaged. Once the chosen gear engagement is accomplished, the flashing light is turned off, which indicates that the desired gear is engaged.

The various features and advantages of this invention will become apparent to those skilled in the art from the following detailed description of the preferred embodiment. The drawings that accompany the detailed description can be described as follows.

DETAILED DESCRIPTION OF THE PREFERRED EMBODIMENT

Figure 1:
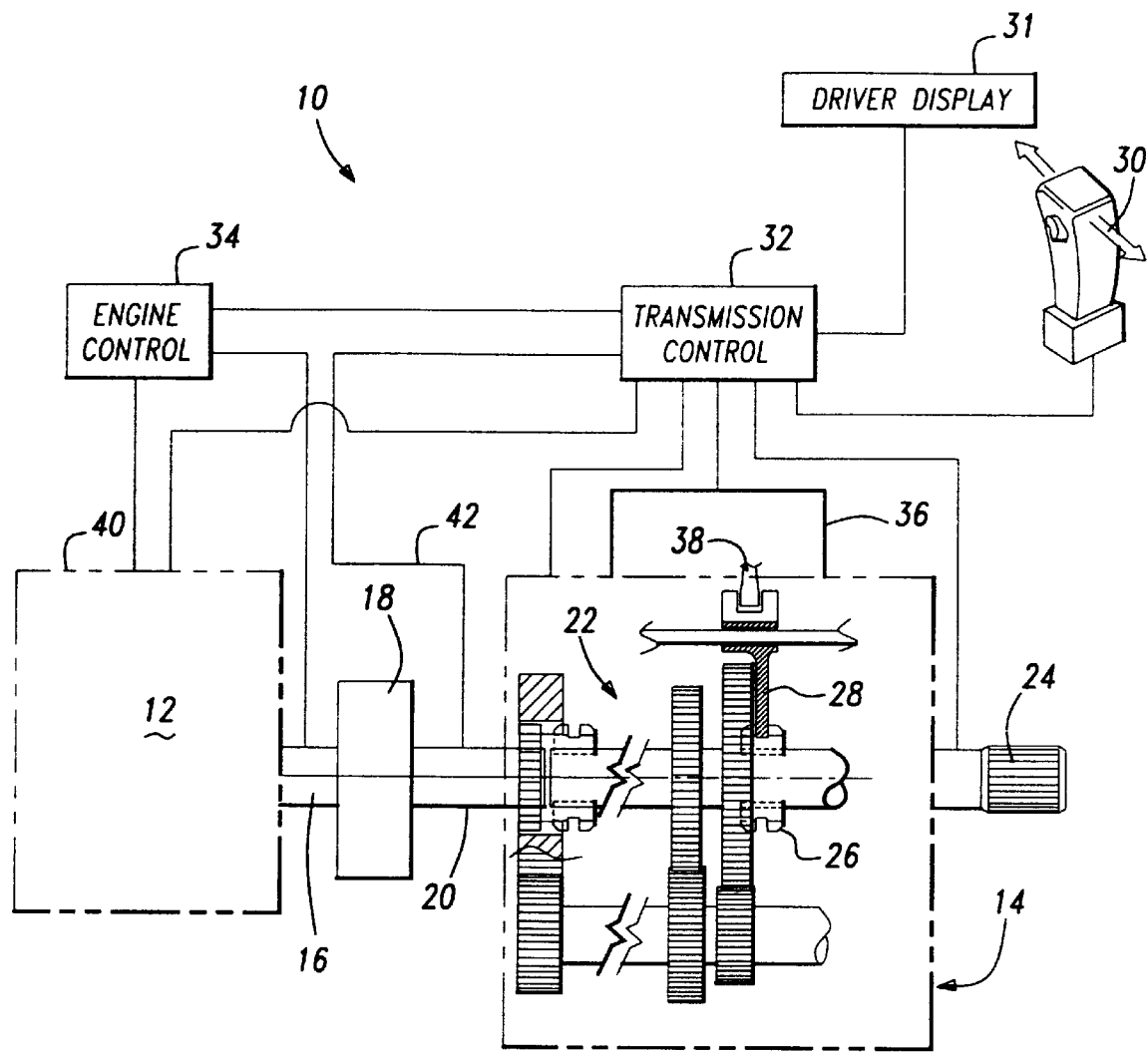
FIG. 1 is a schematic illustration of a vehicle transmission assembly designed according to this invention.

FIG. 1 schematically illustrates a transmission assembly 10. The vehicle engine 12 and the transmission 14 include conventional components unless otherwise indicated. An engine output shaft 16 is connected through a master clutch 18, which is manually operable, to a transmission input shaft 20. When the clutch 18 is open, any rotation of the engine output shaft 16 is not transferred to the transmission input shaft 20. When the clutch 18 is closed, the shafts 18 and 20 are coupled together to rotate generally in unison.

As the transmission input 20 shaft rotates, a gearing arrangement 22 provides a desired driving torque through a transmission output shaft 24. The various gears of the transmission 14 are engaged by moving collars such as the collar 26 through a yoke 28 along conventional shift rails to engage the various gears.

The vehicle operator or driver chooses a desired gear by moving a shift lever 30 in a generally forward or rearward direction. Moving the shift lever 30 in one direction indicates a desire to shift up one or more gears while moving the lever in an opposite direction indicates a desire to shift down one or more gears. The assembly 10 also includes a driver display 31 that communicates the status and operation of the transmission to the driver. The driver display preferably includes such information as a currently engaged gear and whether the transmission can be shifted upward or downward, for example. The driver display 31 preferably also includes a indicator for visually indicating whether a desired gear has been engaged as will be described in more detail below.

The transmission assembly 10 is semi-automatic in that the driver selects a desired gear by moving the shift lever 30. The assembly 10 then automatically effects that desired shift provided that vehicle operating conditions allow the shift to be accomplished. A transmission control unit 32 and an engine control unit 34 are implemented through conventional microprocessors, for example. Although the transmission control unit 32 and the engine control unit 34 are illustrated separately in FIG. 1, they could be accomplished through a single control module. The transmission control unit 32 receives signals from the shift lever 30 that indicate a desired gear. After determining that conditions are appropriate to effect a desired change, the transmission control unit 32 causes a shifting module 36 to move a moving member 38, which protrudes through the housing of the transmission 14, to move the yoke 28 according to the desired gear change. More details regarding the preferred operation of the transmission control unit 32 and the manner of effecting a desired shift can be found in the United States patent application that was filed on May 20, 1996, which has serial number 08/650,749, now U.S. Pat. No. 5,741,202. The teachings of that application are incorporated into this specification by reference.

When a driver desires to move the vehicle after it has been at rest, it is necessary to manually operate the clutch 18. In some transmission systems, a specific, dedicated clutch sensor is provided that monitors the position of the clutch pedal to determine whether the clutch is in an open or closed position. This invention provides the advantage of eliminating the requirement for such components and, therefore, simplifies the design of such a system. This invention determines the status of the clutch by utilizing information that is already available and necessary for other portions of the transmission control. The transmission control unit 32 and the engine control unit 34 utilize information regarding the rotational speeds of the engine output shaft 16 and the transmission input shaft 20. Sensors are schematically illustrated at 40 and 42 for providing the speed information regarding those shafts.

Figure 2:
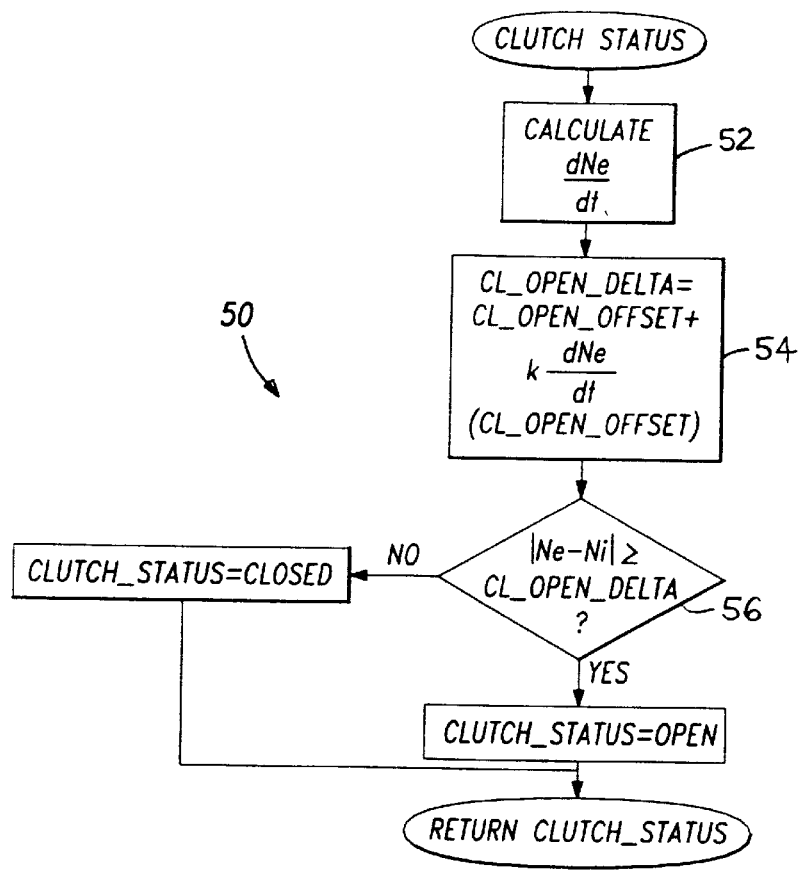
FIG. 2 is a flow chart diagram illustrating a control method of this invention.

This invention includes the method that is illustrated in the flow chart 50 of FIG. 2. When the vehicle is at rest and the driver moves the shift lever 30 to indicate a desired gear, the electronic controller must determine whether the clutch has been appropriately operated. The engine control unit 34 preferably constantly monitors the rotation speed of the engine output shaft 16. The transmission control unit 32 preferably constantly monitors the rotation speed of the transmission input shaft 20. Since these two numbers are known, they are compared to determine the clutch status. Basically, if there is a difference between the rotational speeds of the engine output shaft 16 and the transmission input shaft 20, that indicates that the clutch is open.

As illustrated in FIG. 2, when the electronic controller needs to determine the clutch status, the first step 52 is to calculate the change of the speed of the engine output shaft with respect to time. A preselected value (CL-OPEN-DELTA) is determined at 54 by multiplying the rate of change of the engine output shaft by a preselected constant k, multiplying that by an offset value and adding that product to the offset value. This preselected value (CL-OPEN-DELTA) provides a minimum difference in rotation speeds of the engine output shaft and the transmission input shaft that must be detected before the clutch is determined to be open.

The difference between the rotational speed of the engine output shaft and the rotation of speed of the transmission input shaft are compared to the preselected value at 56. When the difference between the rotational speed of the engine output shaft and the rotational speed of the transmission input shaft is greater than the preselected value (CL-OPEN-DELTA), the clutch status is determined as open. Conversely, when the difference between the rotational speed of the engine output shaft and the transmission input shaft are less than the preselected value, the clutch status is determined to be closed.

It is necessary to determine such a preselected value because there can be slight differences between the rotational speeds of the two shafts even when the clutch is in a closed position. For example, a difference could be detected by the electronic controller because of differences in the sensors used to detect the rotational speeds. Other slight differences could be caused by a dragging clutch, wear in the clutch plates, or a malfunction in a clutch brake, for example. Further, there is the possibility that the rate of updating the information regarding the engine output shaft speed is different than the rate of updating the information regarding the transmission input shaft speed. The preselected minimum difference value accounts for all of these variables. Once the preselected value is determined, the difference between the engine output shaft rotational speed and the transmission input shaft rotational speed is compared to that preselected value at 56. If the difference is greater than the preselected value, the electronic controller determines that the clutch is open. If the difference is less than the preselected value the electronic controller determines that the clutch is closed. The determination of whether the clutch is open or closed dictates subsequent control of the transmission assembly.

An advantage of this invention is that the determination of the preselected value is modified over time. As a transmission is driven, portions of the transmission or the clutch can become worn that may cause slight variations in the rotational speeds of the engine output shaft and the transmission input shaft. Accordingly, the electronic controller preferably is programmed to periodically update the preselected value according to transmission performance characteristics that are observed over time so that an accurate preselected value is utilized. The electronic controller most preferably is programmed to monitor differences in rotational speeds of the two shafts 16 and 20 along with other transmission assembly performance variables to thereby minimize the preselected value so that a more accurate determination of clutch status can be made.

Although the method illustrated in FIG. 2 and described above is utilized for determining the clutch status under start-from-stop conditions, it is not limited to that situation. The method of this invention is useful for determining clutch status at any point during the operation of a vehicle having appropriate components associated with the transmission.

An alternative to the method illustrated in FIG. 2 and described above is to determine the preselected value by combining a static portion with a dynamic portion. The static portion corresponds to CL-OPEN-OFFSET illustrated in FIG. 2. The dynamic portion preferably is (k (CL-OPEN-OFFSET)), where k is a variable. In one embodiment, k is periodically determined based upon dynamic effects that lead to rotational speed differences between the engine output shaft and the transmission input shaft. In another embodiment, k represents the engine output shaft speed, rather than the change in engine output shaft speed.

Another aspect of controlling the vehicle transmission under start-from-stop conditions is providing the driver with an indication whether the next desired gear has been engaged. When the vehicle is at rest and the driver indicates a desired gear by moving the shift lever 30, the transmission control unit 32 causes the driver display to indicate whether the desired gear is engaged. If the desired gear is already engaged, no indication need be given to the driver because the vehicle becomes driveable as expected. When the desired gear is not engaged, that is indicated to the driver by a visual or audible signal, for example. A flashing light is included in one embodiment of this invention. An audible beep is provided in another embodiment of this invention.

When a desired gear has been selected, the transmission control unit 32 causes the shifting module 36 to move the transmission toward engagement of that gear. The driver display 31 provides an indication that the desired gear is not engaged. Under some conditions, the desired gear may not be engaged because of the position of components within the transmission 14 which may result in what is known as a gear butt condition. Another possibility is that the chosen desired gear is not available under the current vehicle conditions. In an embodiment where a light flashes to indicate that the desired gear is not engaged, that light continues flashing until the desired gear is engaged. Once the desired gear is engaged, the light is turned off.

Therefore, the driver knows whether the transmission assembly 10 was able to accomplish the desired shift. If the desired shift has not been accomplished within a time that appears reasonable to the driver, the driver can then take appropriate action to try to engage the desired gear.

Figure 3:
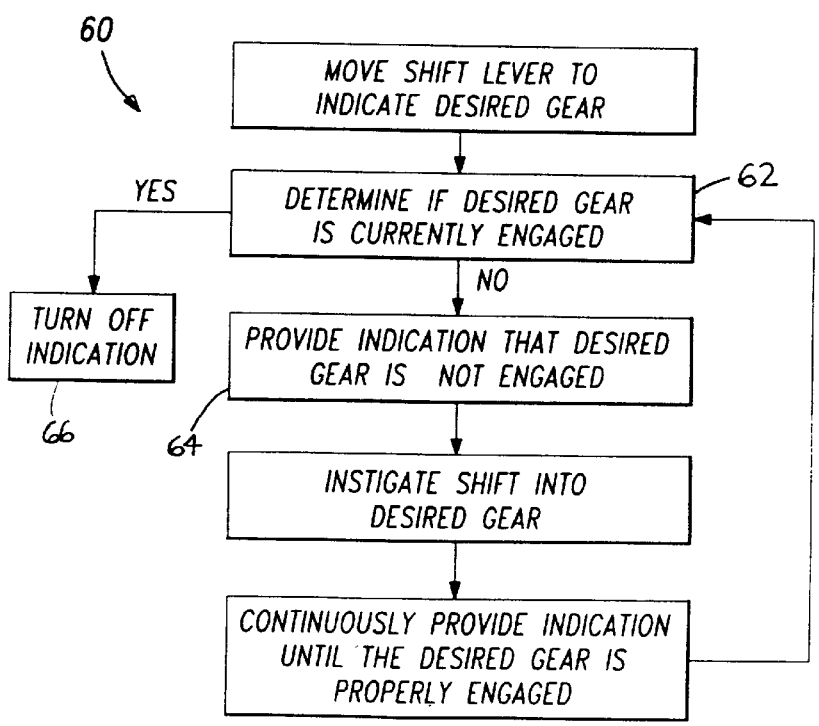
FIG. 3 is a flow chart diagram illustrating a control method of this invention.

This method is illustrated in the flow chart 60 of FIG. 3. Basically, the system determines whether a desired gear is engaged 62. The driver display unit 31 provides a visual or audible signal to the driver that the desired gear is not yet engaged 64. Once the desired gear is engaged, the electronic control unit turns off the signal 66 and the driver knows that the desired shift has been accomplished.

The preceding description is by way of example rather than limiting in nature. Variations and modifications to the disclosed embodiment may become apparent to those skilled in the art that do not necessarily depart from the purview and spirit of this invention. Accordingly, the legal scope of protection given this invention can only be determined by studying the following claims.

We claim:

1. A method of determining the status of a clutch selectively coupling an engine output shaft and a transmission input shaft, comprising the steps of:

(A) determining a rotation speed of the engine output shaft;

(B) determining a rotation speed of the transmission input shaft;

(C) determining a difference between the speeds from step (A) and (B);

(D) determining whether the clutch is open by determining when the difference from step (C) is above a pre-selected value that is at least in part based upon a rate of change of the engine output shaft speed over time.

2. The method of claim 1 including using a constant when determining the pre-selected value and periodically modifying the constant to thereby update the pre-selected value.

3. The method of claim 2, including updating the pre-selected value to account for changes in transmission performance or a condition of the clutch.

4. The method of claim 2, including periodically setting the pre-selected value based upon observed vehicle driveline performance characteristics.

5. The method of claim 2, including using information regarding a condition of a clutch brake when updating the pre-selected value.

6. The method of claim 1, wherein the pre-selected value accounts for differences in a rate of information received while performing step (A) and step (B), respectively.

7. A system for determining clutch status in a vehicle driveline, comprising:

an engine output shaft;

a transmission input shaft;

a clutch that is movable between an open position and an engaged position where the clutch couples the transmission input shaft to the engine output shaft;

a first sensor that detects a rotation speed of said engine output shaft;

a second sensor that detects a rotation speed of said transmission input shaft; and a controller that communicates with said first and second sensors and determines a difference between said engine output shaft speed and said transmission input shaft speed and compares said difference to a pre-selected value that the controller determines at least in part by using a rate of change of the speed of the engine output shaft over time such that the controller determines whether the clutch is in said open position or said engaged position.

8. The system of claim 7, wherein the controller uses a multiplier when determining the pre-selected value and wherein the controller periodically updates the multiplier.

9. The system of claim 8, wherein the pre-selected value accounts for differences in a rate of information received from said first and second sensors, respectively.

10. The system of claim 8, wherein the controller uses observed vehicle driveline performance characteristics when updating the multiplier.

11. The system of claim 8, wherein the controller updates the pre-selected value to account for changes in transmission performance or a condition of the clutch.

12. The system of claim 7, wherein the pre-selected value accounts for differences in a rate of information received from said first and second sensors, respectively.

13. The system of claim 7, wherein the clutch is manually operable.

* * * * *